(12) United States Patent
Ota

(10) Patent No.: US 12,634,006 B2
(45) Date of Patent: May 19, 2026

(54) NETWORK MANAGEMENT APPARATUS, COMMUNICATION APPARATUS, AND NETWORK MANAGEMENT SYSTEM

(71) Applicant: NEC Corporation, Tokyo (JP)

(72) Inventor: Morihiko Ota, Tokyo (JP)

(73) Assignee: NEC CORPORATION, Tokyo (JP)

( * ) Notice: Subject to any disclaimer, the term of this patent is extended or adjusted under 35 U.S.C. 154(b) by 258 days.

(21) Appl. No.: 18/281,980

(22) PCT Filed: Dec. 23, 2021

(86) PCT No.: PCT/JP2021/047759
§ 371 (c)(1),
(2) Date: Sep. 14, 2023

(87) PCT Pub. No.: WO2022/201699
PCT Pub. Date: Sep. 29, 2022

(65) Prior Publication Data
US 2024/0154695 A1 May 9, 2024

(30) Foreign Application Priority Data

Mar. 22, 2021 (JP) ................................. 2021-047961

(51) Int. Cl.
*H04B 10/079* (2013.01)
*H04J 14/02* (2006.01)
(52) U.S. Cl.
CPC ........ *H04B 10/07953* (2013.01); *H04J 14/02* (2013.01); *H04J 14/0201* (2013.01)
(58) Field of Classification Search
None
See application file for complete search history.

(56) References Cited

U.S. PATENT DOCUMENTS 8,625,994 B2 * 1/2014 Archambault ..... H04Q 11/0005
398/43
2004/0028406 A1 * 2/2004 Bortz ................. H04Q 11/0005
398/49
(Continued)

FOREIGN PATENT DOCUMENTS

JP 2000-253443 A 9/2000
JP 2004-056552 A 2/2004
(Continued)

OTHER PUBLICATIONS

International Search Report for PCT Application No. PCT/JP2021/047759, mailed on Mar. 8, 2022.
(Continued)

*Primary Examiner* — Darren E Wolf

(57) ABSTRACT

In an optical communication network including a plurality of communication apparatuses being connected by a transmission path transmitting WDM signal light in which a plurality of optical signals are performed wavelength division multiplexing, a network management apparatus includes an addition control unit that controls a first communication apparatus, when the first communication apparatus adds the optical signal to the WDM signal light, in such a way as to add, to be adjacent to each other, a plurality of the optical signals to be dropped by a second communication apparatus to a wavelength band being sandwiched between guard bands, and a drop control unit that controls the second communication apparatus, when the second communication apparatus drops the optical signal from the WDM signal light.

15 Claims, 19 Drawing Sheets

(56)  References Cited

U.S. PATENT DOCUMENTS

2011/0318021 A1* 12/2011 Zhou ................... H04L 27/0014
                                                       375/376
2019/0313168 A1   10/2019 Eira et al.
2021/0021340 A1*   1/2021 Jiang ................. H04B 10/0793

FOREIGN PATENT DOCUMENTS

JP       2012-195787 A     10/2012
WO       2015/141188 A1     9/2015

OTHER PUBLICATIONS

Nguyen, Hung et al., No guard-band wavelength translation of Nyquist OTDM-WDM signal for spectral defragmentation in an elastic add-drop node, Optics Letters, vol. 38, issue 17, Sep. 1, 2013.
Eira, Antonio et al., On the impact of optimized guard-band assignment for superchannels in flexible-grid optical networks, 2013 Optical Fiber Communication Conference and Exposition and the National Fiber Optic Engineers Conference (OFC/NFOEC), Mar. 17, 2013.

* cited by examiner

NETWORK MANAGEMENT APPARATUS, COMMUNICATION APPARATUS, AND NETWORK MANAGEMENT SYSTEM

This application is a National Stage Entry of PCT/JP2021/047759 filed on Dec. 23, 2021, which claims priority from Japanese Patent Application 2021-047961 filed on Mar. 22, 2021, the contents of all of which are incorporated herein by reference, in their entirety.

TECHNICAL FIELD

The present invention relates to a network management apparatus, a communication apparatus, a network management method, and a network management system.

BACKGROUND ART

Patent Literature 1 describes an optical communication system in which a modulated signal being modulated by a plurality of different modulation methods is provided with a predetermined guard band, based on a bandwidth and a transmission destination.

Patent Literature 2 describes an optical network system in which, when beams of signal light of a plurality of modulation methods are transmitted at a same time, a guard band is provided between adjacent beams of signal light of different modulation methods only when the beams of signal lights are adjacent to each other.

Patent Literature 3 describes a multi-carrier communication system that transmits a signal by reducing a number of guard intervals in a multi-carrier communication method.

Patent Literature 4 describes a base station apparatus that uses a guard time having a length that allows a propagation delay between a base station and a mobile station between channel slots occupied by a same base station.

CITATION LIST

Patent Literature

[Patent Literature 1] International Patent Publication No. WO2015/141188
[Patent Literature 2] Japanese Unexamined Patent Application Publication No. 2012-195787
[Patent Literature 3] Japanese Unexamined Patent Application Publication No. 2004-056552
[Patent Literature 4] Japanese Unexamined Patent Application Publication No. 2000-253443

SUMMARY OF INVENTION

Technical Problem

In optical communication, since a signal band is deleted and signal quality is deteriorated every time passing through a multiplexing apparatus, a guard band is provided, and thereby deterioration of the signal quality is prevented. However, when a guard band is provided, it is necessary to secure a wider band than a signal band, and thus a transmission capacity of a system is reduced.

In view of the problem described above, an object of the present disclosure is to provide a network management apparatus, a communication apparatus, and a network management method that are capable of improving a transmission capacity.

Solution to Problem

A network management apparatus according to one example embodiment includes: in an optical communication network including a plurality of communication apparatuses being connected by a transmission path transmitting WDM signal light in which a plurality of optical signals are performed wavelength division multiplexing, an addition control unit configured to control a first communication apparatus, when the first communication apparatus adds the optical signal to the WDM signal light, in such a way as to add, to be adjacent to each other, a plurality of the optical signals to be dropped by a second communication apparatus to a wavelength band being sandwiched between guard bands; and a drop control unit configured to control the second communication apparatus, when the second communication apparatus drops the optical signal from the WDM signal light, in such a way as to drop a plurality of the optical signals being added, to be adjacent to each other, to the wavelength band being sandwiched between the guard bands.

A communication apparatus according to one example embodiment is connected to an optical communication network including a plurality of communication apparatuses being connected by a transmission path transmitting WDM signal light in which a plurality of optical signals are performed wavelength division multiplexing, when the optical signal is added to the WDM signal light, adds, to be adjacent to each other, a plurality of the optical signals to be dropped by another communication apparatus to a wavelength band being sandwiched between guard bands, and when the optical signal is dropped from the WDM signal light, drops a plurality of the optical signals being added, to be adjacent to each other, to the wavelength band being sandwiched between the guard bands.

A network management method according to one example embodiment includes: in an optical communication network including a plurality of communication apparatuses being connected by a transmission path transmitting WDM signal light in which a plurality of optical signals are performed wavelength division multiplexing, a step of controlling a first communication apparatus, when the first communication apparatus adds the optical signal to the WDM signal light, in such a way as to add, to be adjacent to each other, a plurality of the optical signals to be dropped by a second communication apparatus to a wavelength band being sandwiched between guard bands; and a step of controlling the second communication apparatus, when the second communication apparatus drops the optical signal from the WDM signal light, in such a way as to drop a plurality of the optical signals being added, to be adjacent to each other, to the wavelength band being sandwiched between the guard bands.

Advantageous Effects of Invention

According to one example embodiment, a network management apparatus, a communication apparatus, and a network management method that are capable of improving a transmission capacity are provided.

EXAMPLE EMBODIMENT

Hereinafter, example embodiments will be described with reference to the drawings. For clarity of explanation, the following description and the drawings are omitted and simplified as appropriate. In addition, in each of the drawings, the same elements are denoted by the same reference signs, and redundant descriptions are omitted as necessary.
(Outline of Example Embodiment)

Figure 1:
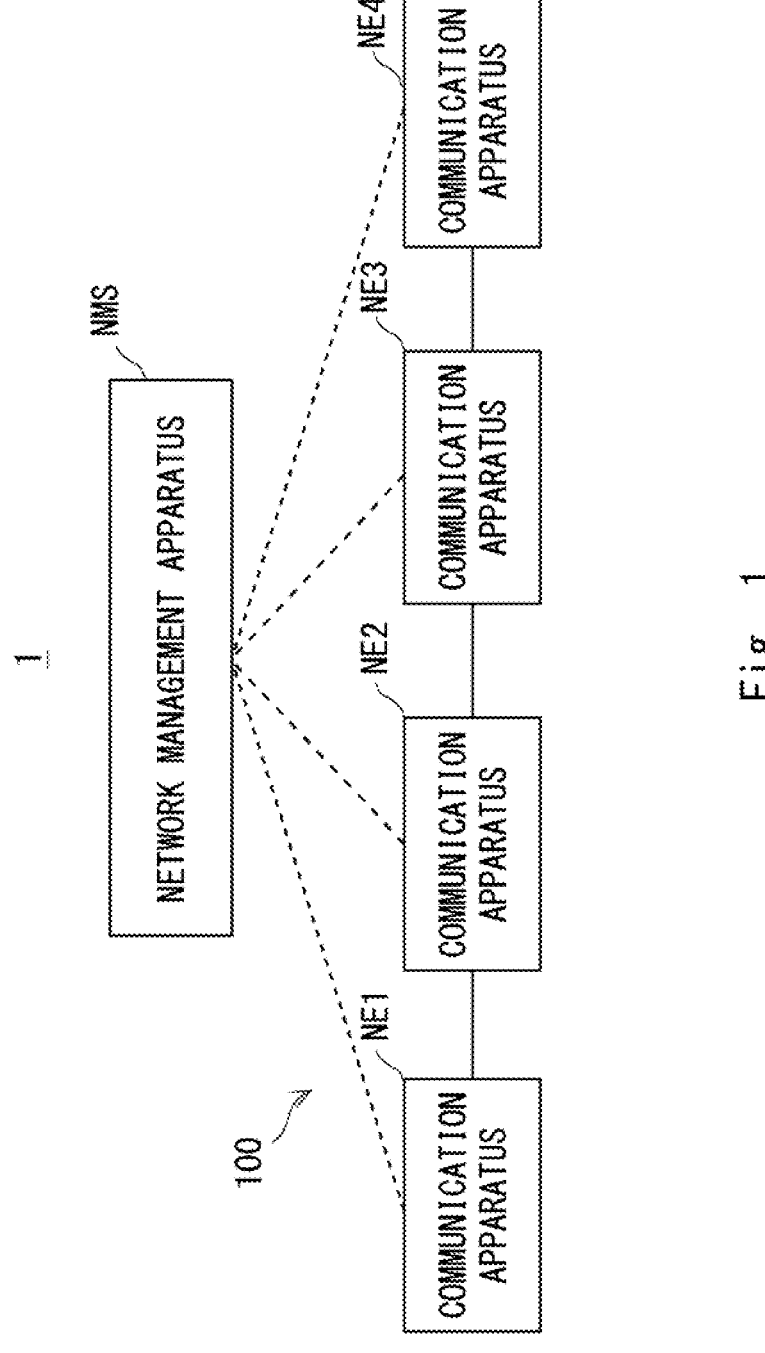
FIG. 1 is a network management system according to an example embodiment.

Prior to the description of example embodiments of the present disclosure, an outline of the example embodiments according to the present disclosure will be described. FIG. 1 is a diagram illustrating a network management system according to the example embodiment.

<Network Management System>

As illustrated in FIG. 1, a network management system 1 includes a network management apparatus NMS and an optical communication network 100. The optical communication network 100 includes a plurality of communication apparatuses NE1 to NE4. Although four communication apparatuses NE1 to NE4 are illustrated in the figure, the number of the communication apparatuses NE1 to NE4 is not limited. Each of the communication apparatuses NE1 to NE4 is connected to an optical communication network via a transmission path. Therefore, the optical communication network 100 is configured by connecting a plurality of communication apparatuses NE1 to NE4 by the transmission path. Each communication apparatus NE may be connected in a point-to-point shape, may be connected in a ring shape, or may be connected in a mesh shape. Note that, the communication apparatuses NE1 to NE4 are collectively referred to as a communication apparatus NE. The transmission path transmits WDM signal light in which a plurality of optical signals are performed wavelength division multiplexing. Each communication apparatus NE is connected to the network management apparatus NMS by a communication line.
<Communication Apparatus>

The communication apparatus NE is a node of the optical communication network 100. The communication apparatus NE may be connected to a not-illustrated transmitter and receiver via a wired or wireless communication line. The communication apparatus NE can function as a multiplexing apparatus, a relay apparatus, and a demultiplexing apparatus by control of reconfigurable optical add and drop multiplexing (ROADM). Operation of each communication apparatus NE is controlled by the network management apparatus NMS. As a result, the optical communication network 100 transmits an optical signal by wavelength division multiplexing (WDM).
<WDM Signal Light of Comparative Example>

Figure 2:
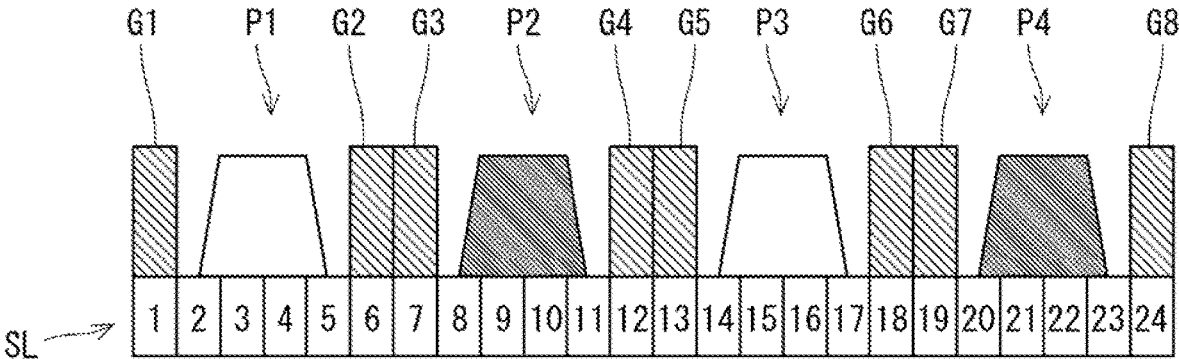
FIG. 2 is a diagram for describing WDM signal light according to a comparative example.
Figure 3:
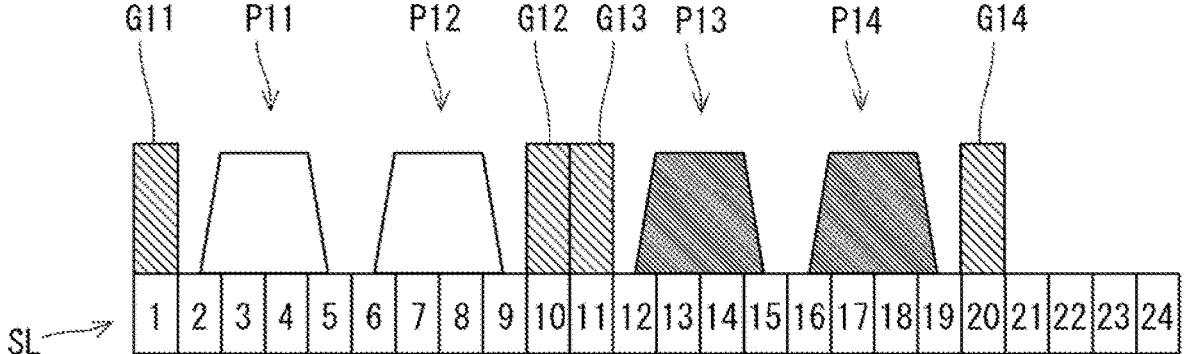
FIG. 3 is a diagram for describing WDM signal light according to the example embodiment.

Herein, WDM signal light transmitted through the optical communication network 100 will be described separately in a comparative example and the example embodiment. FIG. 2 is a diagram for describing WDM signal light according to the comparative example. FIG. 3 is a diagram for describing WDM signal light according to the example embodiment. As illustrated in FIGS. 2 and 3, the WDM signal light is divided into a plurality of wavelength bands. A plurality of slots SL associate to each wavelength band. Therefore, the wavelength band has a plurality of slots SL. In FIGS. 2 and 3, slots SL1 to SL24 are illustrated. First, the comparative example will be described. As illustrated in FIG. 2, WDM signal light of the comparative example includes, for example, optical signals P1 to P4.

The optical signal P1 corresponds to the slot SL2 to the slot SL5. Guard bands G1 and G2 are provided in the slots SL1 and SL6. The optical signal P2 corresponds to the slot SL8 to the slot SL11. Guard bands G3 and G4 are provided in the slots SL7 and SL12. The optical signal P3 corresponds to the slot SL14 to the slot SL17. Guard bands G5 and G6 are provided in the slots SL13 and SL18. The optical signal P4 corresponds to the slot SL20 to the slot SL23. Guard bands G7 and G8 are provided in the slots SL19 and SL24.

The optical signal P1 and the optical signal P3 are optical signals dropped by the same communication apparatus NE. For example, the optical signal P1 and the optical signal P3 are optical signals dropped by the communication apparatus NE4. The optical signal P2 and the optical signal P4 are optical signals dropped by the same communication apparatus NE. For example, the optical signal P2 and the optical signal P4 are optical signals dropped by the communication apparatus NE3.

<WDM Signal Light of Example Embodiment>

Next, WDM signal light according to the example embodiment will be described. As illustrated in FIG. 3, the WDM signal light is divided into a plurality of wavelength bands, and a plurality of slots SL associate to each wavelength band. The WDM signal light includes optical signals P11 to P14.

The optical signal P11 corresponds to a slot SL2 to a slot SL5. The optical signal P12 corresponds to a slot SL6 to a slot SL9. The optical signal P11 and the optical signal P12 are optical signals dropped by the same communication apparatus NE. For example, the optical signal P11 and the optical signal P12 are optical signals dropped by the communication apparatus NE4. Guard bands G11 and G12 are provided in slots SL1 and SL10. The optical signal P13 corresponds to a slot SL12 to a slot SL15. The optical signal P14 corresponds to a slot SL16 to a slot SL19. Guard bands G13 and G14 are provided in slots SL11 and SL20. The optical signal P13 and the optical signal P14 are optical signals dropped by the same communication apparatus NE. For example, the optical signal P13 and the optical signal P14 are optical signals dropped by the communication apparatus NE3. In the example embodiment, four slots can be reduced as compared with the comparative example.

<Network Management Apparatus>

Figure 4:
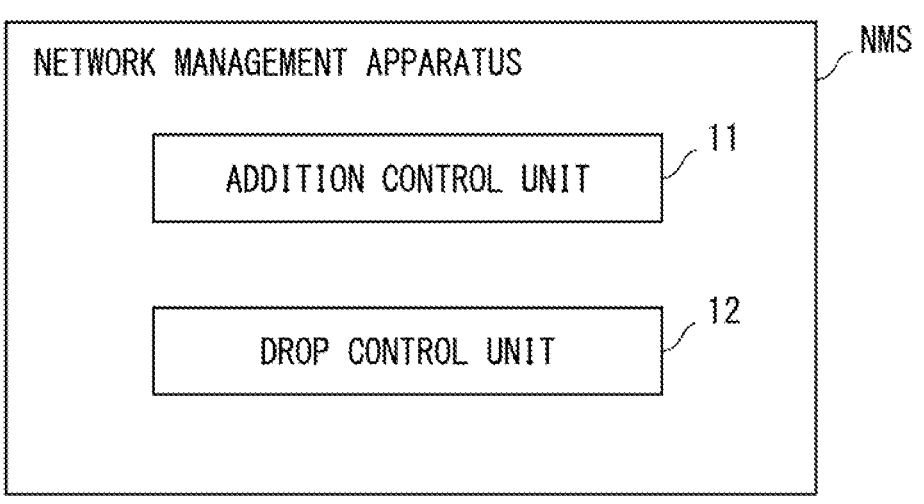
FIG. 4 is a block diagram illustrating a network management apparatus according to the example embodiment.

FIG. 4 is a block diagram illustrating the network management apparatus NMS according to the example embodiment. As illustrated in FIG. 4, the network management apparatus NMS includes an addition control unit 11, and a drop control unit 12. The addition control unit 11 and the drop control unit 12 have a function as an addition control means and a drop control means.

In the optical communication network 100, for example, when the communication apparatus NE1 adds the optical signal P12 to the WDM signal light, the addition control unit 11 controls the communication apparatus NE1 in such a way as to add, to be adjacent to each other, a plurality of optical signals P11 and P12 to be dropped by the communication apparatus NE4 to a wavelength band being sandwiched between the guard bands G11 and G12. In addition, when the communication apparatus NE1 adds the optical signal P14 to the WDM signal light, the addition control unit 11 controls the communication apparatus NE1 in such a way as to, for example, add, to be adjacent to each other, a plurality of the optical signals P13 and P14 to be dropped by the communication apparatus NE3 to a wavelength band being sandwiched between the guard bands G13 and G14.

When the communication apparatus NE4 drops the optical signals P11 and P12 from the WDM signal light, the drop control unit 12 controls the communication apparatus NE4 in such a way as to drop a plurality of the optical signals P11 and P12 being added, to be adjacent to each other, to the wavelength band being sandwiched between the guard bands G11 and G12 by the communication apparatus NE4. In addition, when the communication apparatus NE3 drops the optical signals P13 and P14 from the WDM signal light, the drop control unit 12 controls the communication apparatus NE3 in such a way as to trop a plurality of the optical signals P13 and P14 being added, to be adjacent to each other, to the wavelength band being sandwiched between the guard bands G13 and G14 by the communication apparatus NE3.

The communication apparatuses NE1 to NE4 are connected to the optical communication network 100 including a plurality of the communication apparatuses NE1 to NE4 connected by the transmission path. When adding the optical signal P12 to the WDM signal light, the communication apparatus NE1 adds, to be adjacent to each other, for example, a plurality of the optical signals P11 and P12 to be dropped by the communication apparatus NE4 to the wavelength band being sandwiched between the guard bands G11 and G12. In addition, when adding the optical signal P14 to the WDM signal light, the communication apparatus NE1 adds, to be adjacent to each other, for example, a plurality of the optical signals P13 and P14 to be dropped by the communication apparatus NE3 to the wavelength band being sandwiched between the guard bands G13 and G14.

When dropping the optical signals P13 and P14 from the WDM signal light, the communication apparatus NE3 drops the plurality of optical signals P13 and P14 being added to the wavelength band being sandwiched between the guard bands G13 and G14.

When dropping the optical signals P11 and P12 from the WDM signal light, the communication apparatus NE4 drops the plurality of optical signals P11 and P12 being added to the wavelength band being sandwiched between the guard bands G11 and G12.

<Network Management Method>

Figure 5:
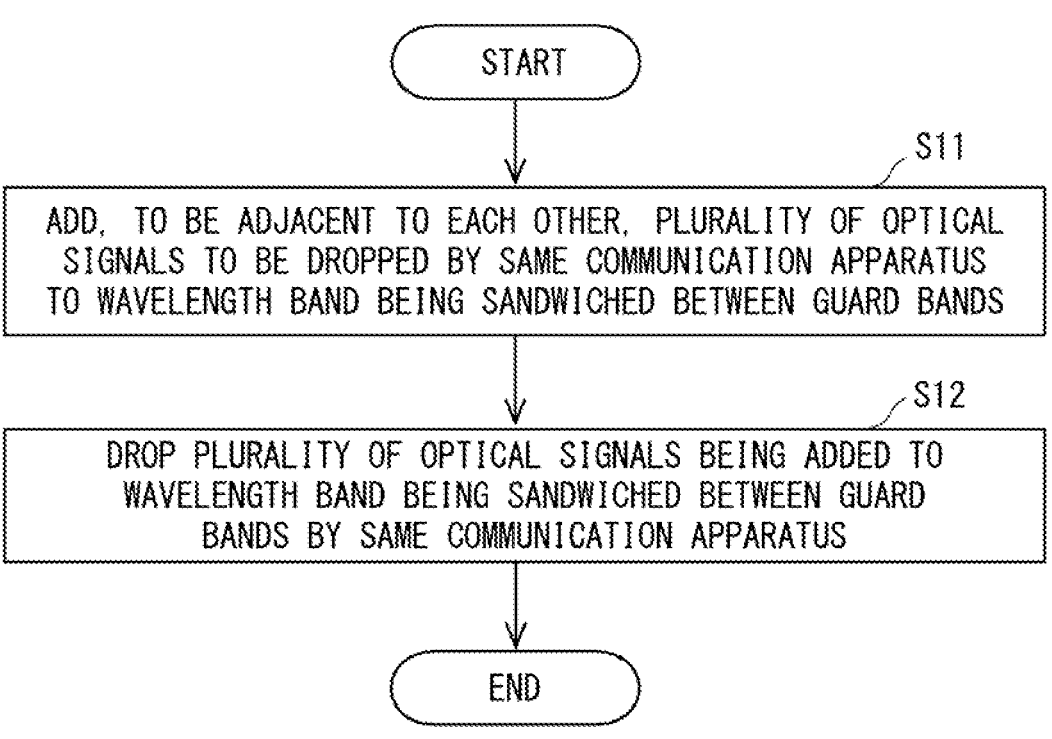
FIG. 5 is a flowchart illustrating a network management method in network management according to the example embodiment.

FIG. 5 is a flowchart illustrating a network management method of the network management apparatus NMS according to the example embodiment.

As illustrated in step S11 in FIG. 5, in the optical communication network 100, when the communication apparatus NE1 adds the optical signal P12 to the WDM signal light, the communication apparatus NE1 is controlled in such a way as to add, to be adjacent to each other, for example, the plurality of optical signals P11 and P12 to be dropped by the same communication apparatus NE4 to the wavelength band being sandwiched between the guard bands G11 and G12.

Next, as illustrated in step S12, in the optical communication network 100, when the communication apparatus NE4 drops the optical signals P11 and P12 from the WDM signal light, the communication apparatus NE4 is controlled in such a way as to drop the plurality of optical signals P11 and P12 being added, to be adjacent to each other, to the wavelength band being sandwiched between the guard bands G11 and G12 by the communication apparatus NE4.

Since the network management apparatus NMS according to the example embodiment adds, to be adjacent to each other, a plurality of optical signals to be dropped by the same communication apparatus NE to a wavelength band being sandwiched between guard bands, the guard band between adjacent optical signals can be reduced, and a maximum transmission capacity of the optical communication network can be improved.

First Example Embodiment

Next, a network management system 1 according to a first example embodiment will be described in detail. First, a communication apparatus NE will be described.

<Configuration of Communication Apparatus>

Figure 6:
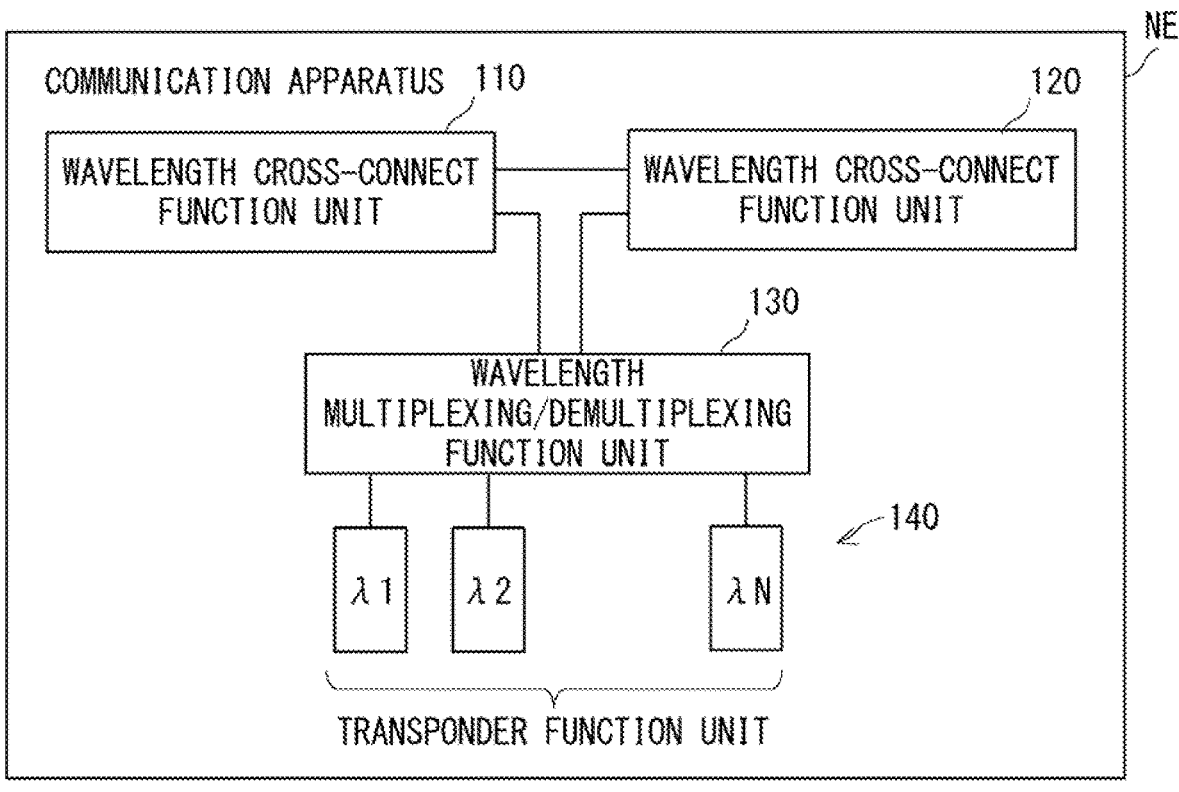
FIG. 6 is a block diagram illustrating a configuration of a communication apparatus according to a first example embodiment.

FIG. 6 is a block diagram illustrating a configuration of the communication apparatus NE according to the first example embodiment. As illustrated in FIG. 6, the communication apparatus NE includes a wavelength cross-connect function unit 110, a wavelength cross-connect function unit 120, a wavelength multiplexing/demultiplexing function unit 130, and a transponder function unit 140. The wavelength cross-connect function unit 110 and the wavelength cross-connect function unit 120 have a function as a wavelength cross-connect means. The wavelength multiplexing/demultiplexing function unit 130 and the transponder function unit 140 have a function as a wavelength multiplexing/demultiplexing means and a transponder means. Note that, the wavelength cross-connect function unit 110, the wavelength cross-connect function unit 120, the wavelength multiplexing/demultiplexing function unit 130, and the transponder function unit 140 are also referred to as a first cross-connect unit, a second cross-connect unit, a wavelength multiplexing/demultiplexing unit, and a transponder unit.

An amplifier may be connected to the wavelength cross-connect function unit 110 and the wavelength cross-connect function unit 120. A transmitter and a receiver may be connected to the wavelength multiplexing/demultiplexing function unit 130 via the transponder function unit 140. The wavelength cross-connect function unit 120 and the wavelength multiplexing/demultiplexing function unit 130 can constitute a multiplexing apparatus. The wavelength cross-connect function unit 110 and the wavelength multiplexing/demultiplexing function unit 130 can constitute a demultiplexing apparatus. The wavelength cross-connect function unit 110 and the wavelength cross-connect function unit 120 can constitute a relay apparatus. Note that, the relay apparatus may not include the wavelength cross-connect function unit 110 and the wavelength cross-connect function unit 120, and may be constituted by an amplifier.

The wavelength cross-connect function unit 110 drops a predetermined optical signal from received WDM signal light. Specifically, the wavelength cross-connect function unit 110 selects and switches a wavelength band in which an optical signal is to be dropped. The wavelength cross-connect function unit 120 adds a predetermined optical signal to WDM signal light. Specifically, the wavelength cross-connect function unit 120 selects and switches a wavelength band in which an optical signal is to be added.

The wavelength multiplexing/demultiplexing function unit 130 and the transponder function unit 140 transmit an optical signal being dropped by the wavelength cross-connect function unit 110 to the receiver. Specifically, the wavelength multiplexing/demultiplexing function unit 130 and the transponder function unit 140 receive a dropped optical signal from a wavelength band. In this case, a drop control unit 12 controls the wavelength cross-connect function unit 110, the wavelength multiplexing/demultiplexing function unit 130, and the transponder function unit 140. Meanwhile, the wavelength multiplexing/demultiplexing function unit 130 and the transponder function unit 140 multiplex an optical signal transmitted from the transmitter, and transmit the multiplexed optical signal to the wavelength cross-connect function unit 120. Specifically, the wavelength multiplexing/demultiplexing function unit 130 and the transponder function unit 140 transmit, to a wavelength band, an optical signal to be added. In this case, an addition control unit 11 of a network management apparatus NMS controls the wavelength cross-connect function unit 120, the wavelength multiplexing/demultiplexing function unit 130, and the transponder function unit 140.

Figure 7:
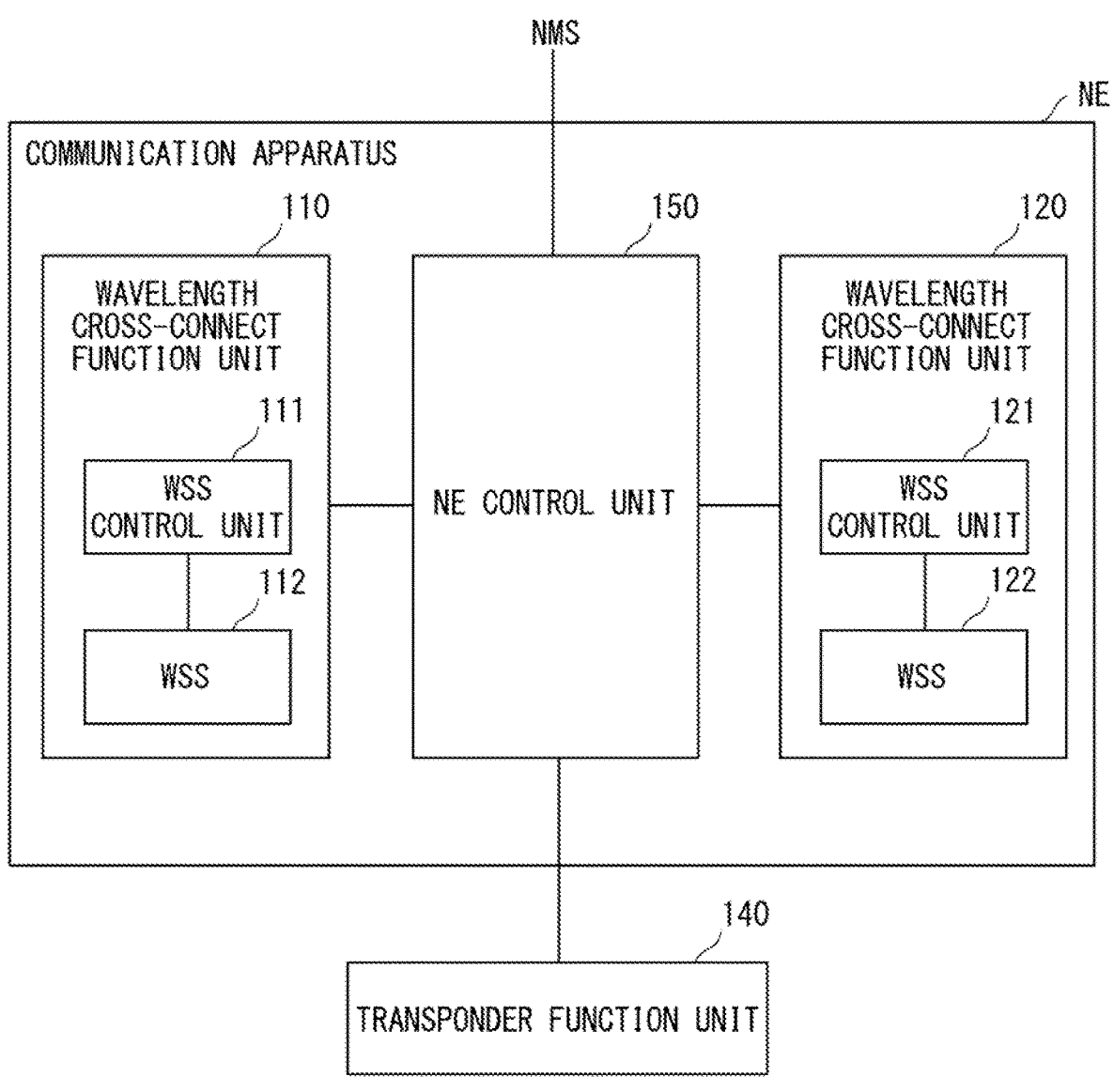
FIG. 7 is a block diagram illustrating a configuration of the communication apparatus according to the first example embodiment.

FIG. 7 is a block diagram illustrating a configuration of the communication apparatus NE according to the first example embodiment. As illustrated in FIG. 7, the communication apparatus NE may include the wavelength cross-connect function unit 110, the wavelength cross-connect function unit 120, and an NE control unit 150.

The wavelength cross-connect function unit 110 includes a WSS control unit 111 and a wavelength selective switch

112. The WSS control unit 111 has a function as a control means for controlling operation of the wavelength selective switch 112. The wavelength selective switch 112 has a function as a switch means for selecting a predetermined wavelength.

The wavelength cross-connect function unit 120 includes a WSS control unit 121 and a wavelength selective switch 122. The WSS control unit 121 has a function as a control means for controlling operation of the wavelength selective switch 122. The wavelength selective switch 122 has a function as a switch means for selecting a predetermined wavelength.

The NE control unit 150 is connected to the wavelength cross-connect function unit 110, the wavelength cross-connect function unit 120, the network management apparatus NMS, and the transponder function unit 140. The NE control unit 150 has a function as a control means for controlling operation of the wavelength cross-connect function unit 110, the wavelength cross-connect function unit 120, the transponder function unit 140, and the not-illustrated wavelength multiplexing/demultiplexing function unit 130.

Figure 8:
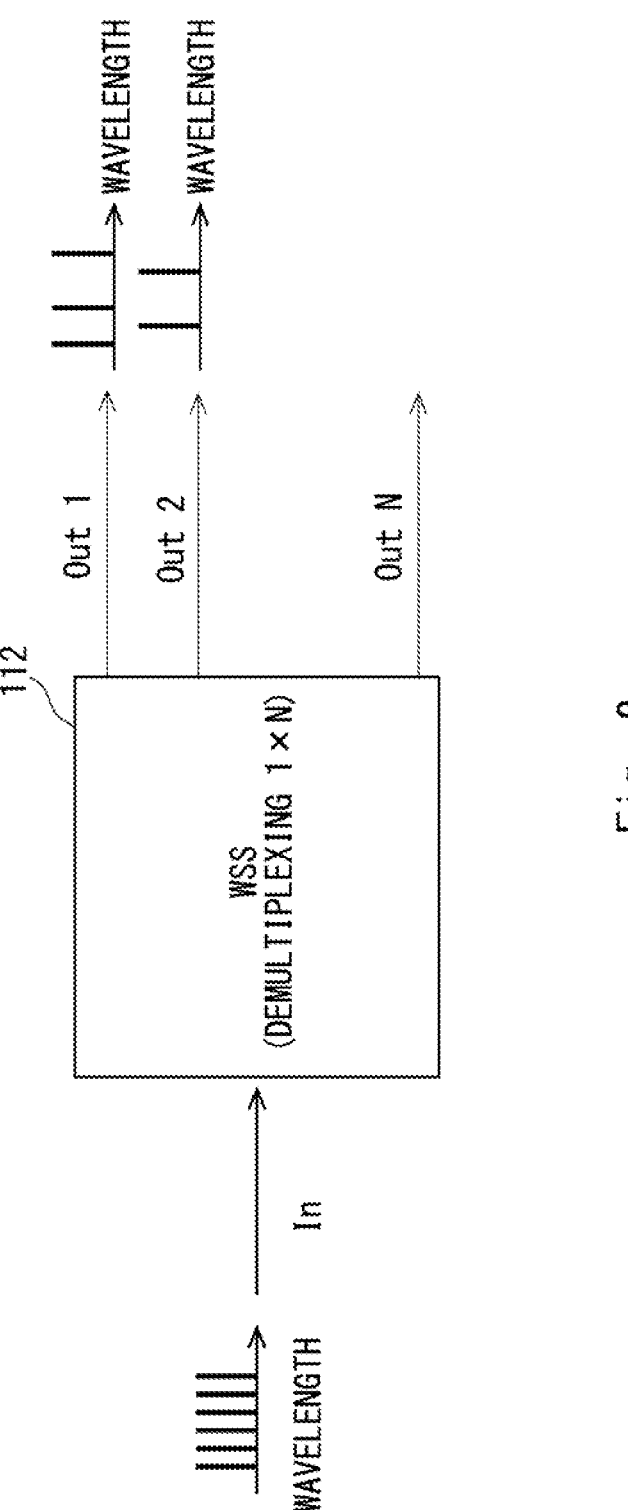
FIG. 8 is a diagram illustrating a wavelength demultiplexing function of a wavelength selective switch in a wavelength cross-connect function unit according to the first example embodiment.

FIG. 8 is a diagram illustrating a wavelength demultiplexing function of the wavelength selective switch 112 in the wavelength cross-connect function unit 110 according to the first example embodiment. As illustrated in FIG. 8, the wavelength selective switch 112 drops an optical signal having predetermined wavelengths λ1 to λN when WDM signal light including the optical signal having the wavelengths λ1 to λN is incident.

Figure 9:
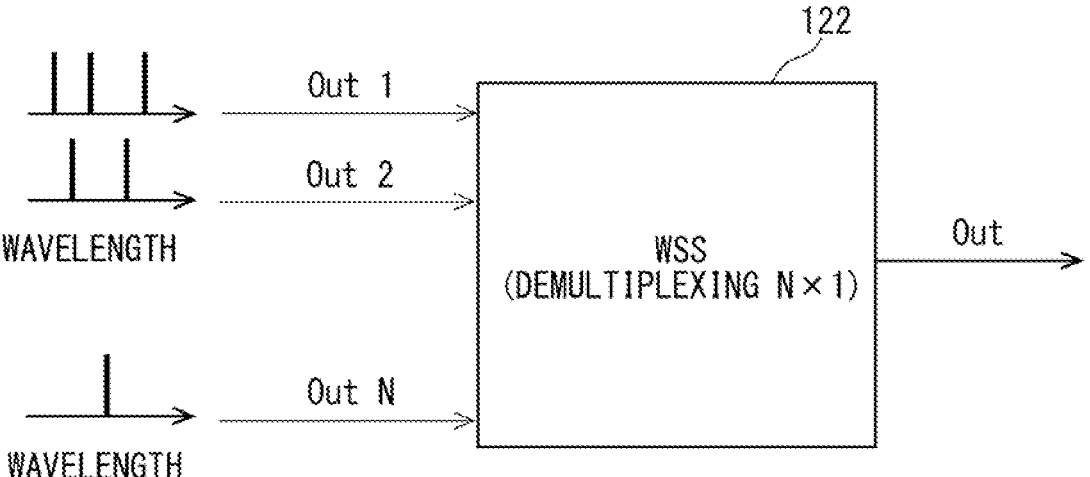
FIG. 9 is a diagram illustrating a wavelength multiplexing function of the wavelength selective switch in the wavelength cross-connect function unit according to the first example embodiment.

FIG. 9 is a diagram illustrating a wavelength multiplexing function of the wavelength selective switch 122 in the wavelength cross-connect function unit 120 according to the first example embodiment. As illustrated in FIG. 9, the wavelength selective switch 122 multiplexes each optical signal having wavelengths λ1 to λN and outputs WDM signal light including the optical signal when the optical signal having the wavelengths λ1 to λN is incident.

<Configuration of Network Management Apparatus>

Figure 10:
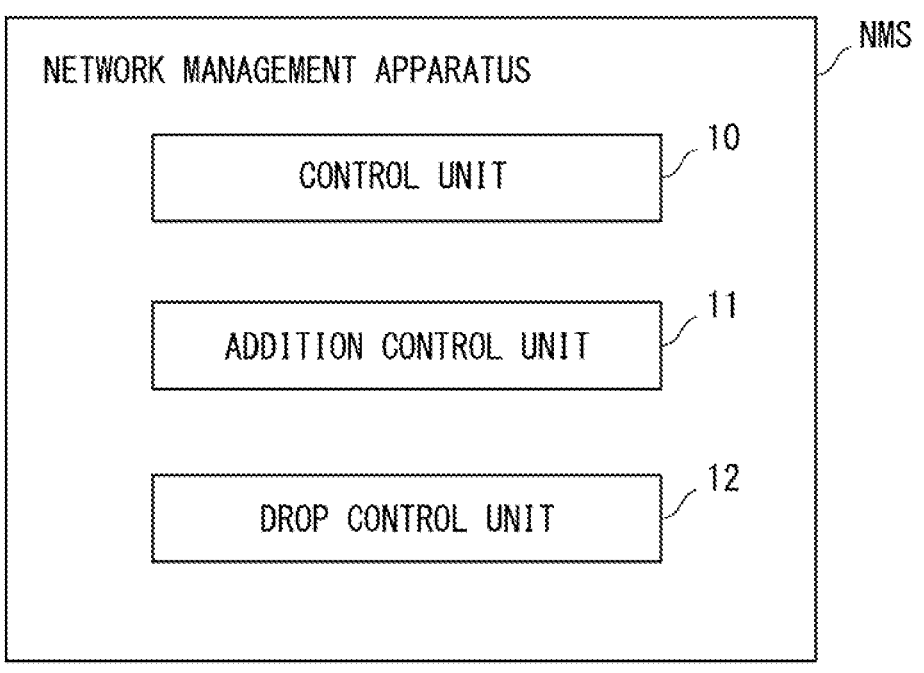
FIG. 10 is a block diagram illustrating a configuration of a network management apparatus according to the first example embodiment.

Next, the network management apparatus NMS will be described. FIG. 10 is a block diagram illustrating a configuration of the network management apparatus NMS according to the first example embodiment. As illustrated in FIG. 10, the network management apparatus NMS may include a control unit 10, in addition to the addition control unit 11 and the drop control unit 12. The control unit 10 has a function as a control means. The network management apparatus NMS is, for example, a computer, and the control unit 10 is, for example, a processor such as a central processing unit (CPU).

The control unit 10 has a function as an arithmetic apparatus that performs control processing, arithmetic processing, and the like. The control unit 10 controls operation of the addition control unit 11 and the drop control unit 12. In addition, the control unit 10 may control various pieces of operation of the communication apparatus NE.

The network management apparatus NMS may include a storage unit, a communication unit, and an interface unit that are not illustrated, in addition to the control unit 10. The storage unit may include, for example, a storage apparatus such as a memory or a hard disk. The storage apparatus is, for example, a read only memory (ROM), a random access memory (RAM), or the like. The storage unit has a function for storing a control program, an arithmetic program, and the like executed by the control unit 10. In addition, the storage unit has a function for temporarily storing processing data and the like. The storage unit can include a database. The communication unit performs processing necessary for performing communication with another apparatus via a wired or wireless network or the like. The communication unit can include a communication port, a router, a firewall, and the like. The interface unit is, for example, a user interface. The interface unit includes an input apparatus such as a keyboard, a touch panel, or a mouse, and an output apparatus such as a display or a speaker. The interface unit accepts an operation of inputting data by a user (such as an operator), and outputs information to the user. The control unit 10, the storage unit, the communication unit, and the interface unit are connected to one another via a data bus or the like.

The network management apparatus NMS includes the addition control unit 11 and the drop control unit 12 as a component. Each component can be achieved by, for example, causing a program to be executed by control of the control unit 10. More specifically, each component can be achieved by the control unit 10 executing a program stored in the storage unit. In addition, a necessary program may be recorded in any non-volatile recording medium, installed as necessary, and thereby each component may be to be achieved. In addition, each component is not limited to being achieved by software by a program, and may be achieved by any combination or the like of hardware, firmware, and software. In addition, each component may be achieved by using a user-programmable integrated circuit such as a field-programmable gate array (FPGA) or a micro-computer. In this case, a program configured by each component described above may be achieved by using the integrated circuit.

<Network Management Method of Comparative Example>

Next, a network management method will be described as operation of the network management apparatus NMS of the present example embodiment. First, a network management method in a comparative example will be described. Subsequently, the network management method of the present example embodiment will be described in comparison with the comparative example.

Figure 11:
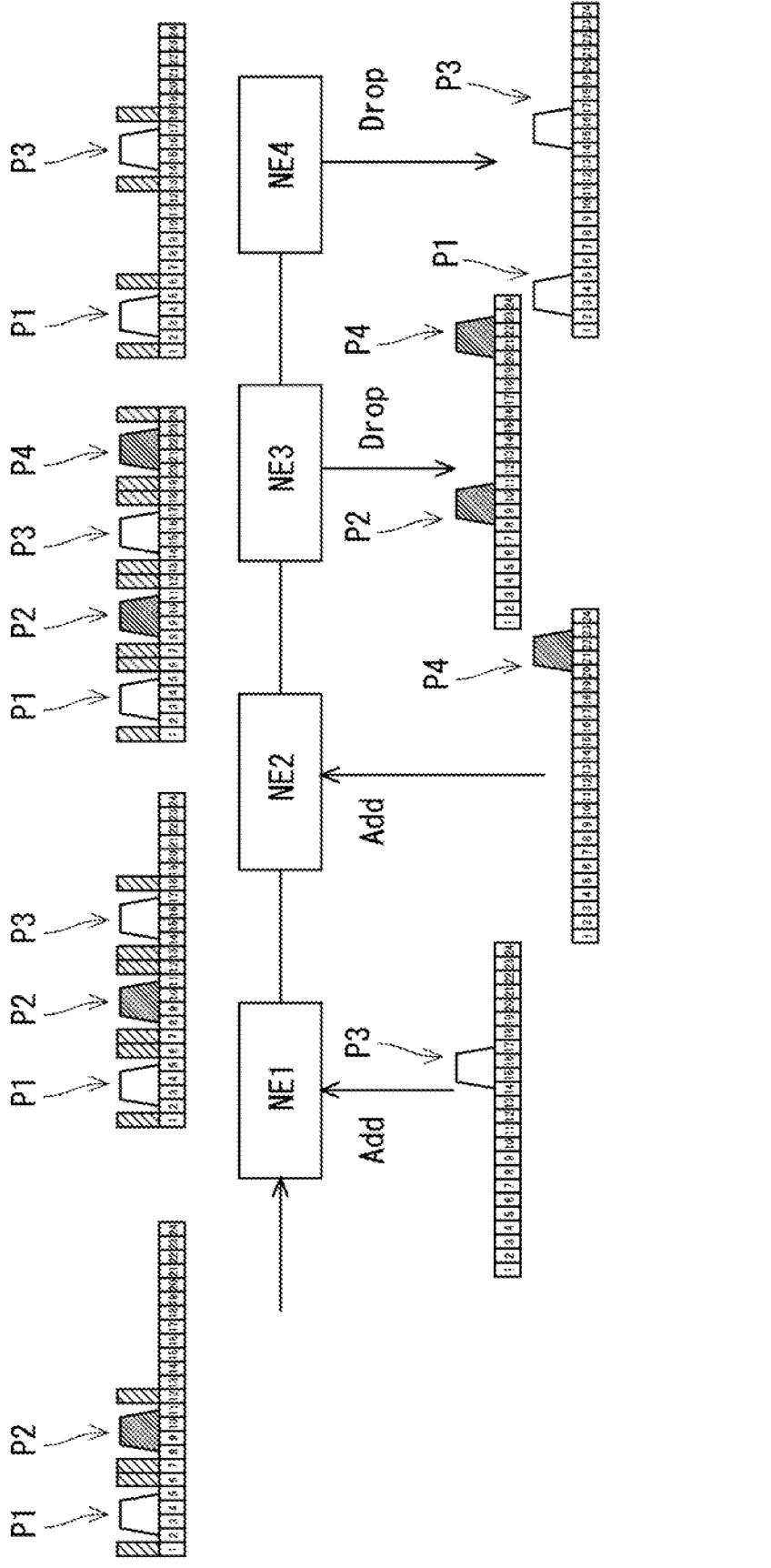
FIG. 11 is a diagram illustrating a network management method according to a comparative example.

FIG. 11 is a diagram illustrating the network management method according to the comparative example. As illustrated in FIGS. 2 and 11, a communication apparatus NE1 receives WDM signal light including an optical signal P1 and an optical signal P2. The optical signal P1 is an optical signal to be dropped by a communication apparatus NE4, and the optical signal P2 is an optical signal to be dropped by a communication apparatus NE3. Guard bands G1 and G2 are provided in slots SL1 and SL6 on both sides of the optical signal P1. Guard bands G3 and G4 are provided in slots SL7 and SL12 on both sides of the optical signal P2. Note that, some reference signs are omitted in such a way as not to complicate the drawings.

The communication apparatus NE1 adds an optical signal P3 to the received WDM signal light, and multiplexes the WDM signal light. The optical signal P3 is an optical signal to be dropped by the communication apparatus NE4. In the communication apparatus NE1, guard bands G5 and G6 are provided in slots SL3 and SL18 on both sides of the optical signal P3. The communication apparatus NE1 outputs, to a communication apparatus NE2, the WDM signal light acquired by adding the optical signal P3 and being multiplexed.

The communication apparatus NE2 receives WDM signal light including the optical signal P1, the optical signal P2, and the optical signal P3. The communication apparatus NE2 adds an optical signal P4 to the received WDM signal light, and multiplexes the WDM signal light. The optical signal P4 is an optical signal to be dropped by the communication apparatus NE3. In the communication apparatus NE2, guard bands G7 and G8 are provided in slots SL19 and SL24 on both sides of the optical signal P4. As a result, the WDM signal light includes the optical signals P1 to P4 as illustrated in FIG. 2. The communication apparatus NE2 outputs, to the communication apparatus NE3, the WDM signal light acquired by adding the optical signal P4 and being multiplexed.

The communication apparatus NE3 receives WDM signal light including the optical signals P1 to P4. The communication apparatus NE3 drops the optical signal P2 and the optical signal P4 from the WDM signal light. The communication apparatus NE3 outputs, to the communication apparatus NE4, the WDM signal light acquired by dropping the optical signal P2 and the optical signal P4.

The communication apparatus NE4 receives WDM signal light including the optical signals P1 and P3. The communication apparatus NE4 drops the optical signal P1 and the optical signal P3 from the WDM signal light. The communication apparatus NE4 outputs, to a next communication apparatus NE, the WDM signal light acquired by dropping the optical signal P1 and the optical signal P3.

<Network Management Method of Example Embodiment>

Figure 12:
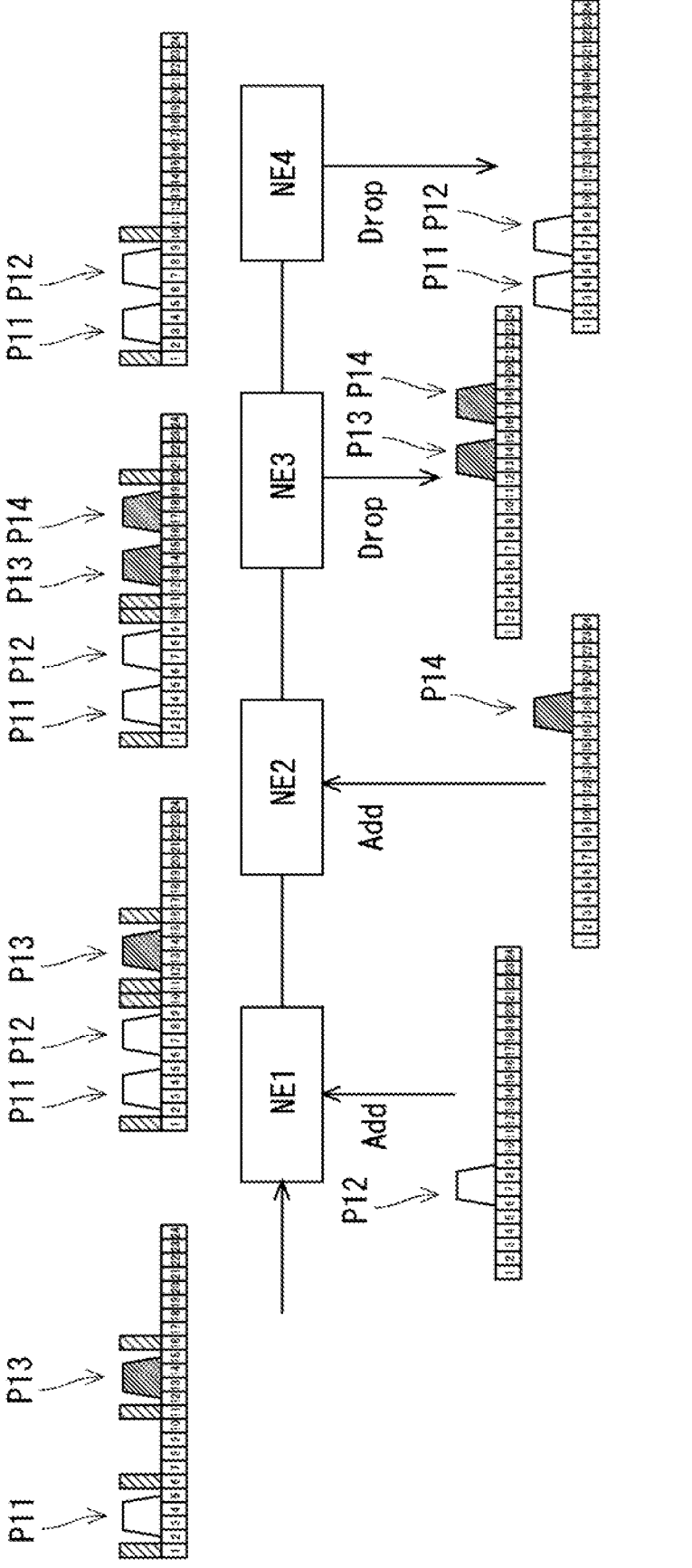
FIG. 12 is a diagram illustrating a network management method according to the first example embodiment.

Next, the network management method according to the present example embodiment will be described. FIG. 12 is a diagram illustrating the network management method according to the first example embodiment. As illustrated in FIGS. 3 and 12, the communication apparatus NE1 receives WDM signal light including the optical signal P11 and the optical signal P13. The optical signal P11 is an optical signal to be dropped by the communication apparatus NE4, and the optical signal P13 is an optical signal to be dropped by the communication apparatus NE3. Guard bands are provided in the slots SL1 and SL6 on both sides of the optical signal P11. Guard bands are provided in the slots SL11 and SL16 on both sides of the optical signal P13.

The communication apparatus NE1 adds the optical signal P12 to the received WDM signal light, and multiplexes the WDM signal light. Similarly to the optical signal P11, the optical signal P12 is an optical signal to be dropped by the communication apparatus NE4. Therefore, when the communication apparatus NE1 adds the optical signal P12 to the WDM signal light, the addition control unit 11 controls the communication apparatus NE1 in such a way as to add, to be adjacent to each other, a plurality of the optical signals P11 and P12 to be dropped by the communication apparatus NE4 to a wavelength band being sandwiched between the guard bands G11 and G12. As a result, the wavelength cross-connect function unit 120 of the communication apparatus NE1 selects and switches a wavelength band in which the optical signal P12 is to be added. Therefore, the wavelength cross-connect function unit 120 opens the wavelength band being sandwiched between the guard bands G11 and G12. The wavelength multiplexing/demultiplexing function unit 130 and the transponder function unit 140 add the optical signal P12 to be adjacent to the wavelength band being sandwiched between the guard bands G11 and G12. The communication apparatus NE1 outputs, to the communication apparatus NE2, the WDM signal light acquired by adding the optical signal P12 and being multiplexed.

The communication apparatus NE2 receives WDM signal light including the optical signal P11, the optical signal P12, and the optical signal P13. The communication apparatus NE2 adds the optical signal P14 to the received WDM signal light, and multiplexes the WDM signal light. Similarly to the optical signal P13, the optical signal P14 is an optical signal to be dropped by the communication apparatus NE3. Therefore, when the communication apparatus NE2 adds the optical signal P14 to the WDM signal light, the addition control unit 11 controls the communication apparatus NE2 in such a way as to add, to be adjacent to each other, a plurality of the optical signals P13 and P14 to be dropped by the communication apparatus NE3 to a wavelength band being sandwiched between the guard bands G13 and G14. As a result, the wavelength cross-connect function unit 120 of the communication apparatus NE2 selects and switches a wavelength band in which the optical signal P14 is to be added. Therefore, the wavelength cross-connect function unit 120 opens the wavelength band being sandwiched between the guard bands G13 and G14. The wavelength multiplexing/demultiplexing function unit 130 and the transponder function unit 140 add the optical signal P14 to the wavelength band being sandwiched between the guard bands G13 and G14. As illustrated in FIG. 3, the WDM signal light includes optical signals P11 to P14. The communication apparatus NE2 outputs, to the communication apparatus NE3, the WDM signal light acquired by being multiplexed.

The communication apparatus NE3 receives WDM signal light including the optical signals P11 to P14. The communication apparatus NE3 drops the optical signal P13 and the optical signal P14 from the WDM signal light. For example, when the communication apparatus NE3 drops the optical signals P13 and P14 from the WDM signal light, the drop control unit 12 controls the communication apparatus NE3 in such a way as to drop a plurality of the optical signals P13 and P14 being added in the wavelength band being sandwiched between the guard bands G13 and G14 by the communication apparatus NE3. As a result, the wavelength cross-connect function unit 110 of the communication apparatus NE3 selects and switches the wavelength band in which the optical signals P13 and P14 are to be dropped. The wavelength multiplexing/demultiplexing function unit 130 and the transponder function unit 140 drop the optical signals P13 and P14 from the wavelength band being sandwiched between the guard bands G13 and G14. The communication apparatus NE3 outputs, to the communication apparatus NE4, the WDM signal light acquired by dropping the optical signals P13 and P14 and being wavelength demultiplexed.

The communication apparatus NE4 receives WDM signal light including the optical signals P11 to P12. The communication apparatus NE4 drops the optical signal P11 and the optical signal P12 from the WDM signal light. For example, when the communication apparatus NE4 drops the optical signals P11 and P12 from the WDM signal light, the drop control unit 12 controls the communication apparatus NE4 in such a way as to drop a plurality of the optical signals P11 and P12 being added in the wavelength band being sandwiched between the guard bands G11 and G12 by the communication apparatus NE4. As a result, the wavelength cross-connect function unit 110 of the communication apparatus NE4 selects and switches the wavelength band in which the optical signals P11 and P12 are to be dropped. The wavelength multiplexing/demultiplexing function unit 130 and the transponder function unit 140 drop the optical signals P11 and P12 from the wavelength band being sandwiched between the guard bands G11 and G12. The communication apparatus NE4 outputs, to the next communication apparatus NE, the WDM signal light acquired by dropping the optical signals P11 and P12 and being wavelength demultiplexed.

Next, an advantageous effect of the present example embodiment will be described. In the present example embodiment, the network management apparatus NMS controls the wavelength cross-connect function units 110 and 120, the wavelength multiplexing/demultiplexing function unit 130, and the transponder function unit 140 of the communication apparatus NE, and thereby collectively transmit optical signals to be dropped by the same communication apparatus NE. As a result, a guard band between adjacent optical signals can be reduced. Therefore, a transmission capacity of the optical communication network can be improved.

Second Example Embodiment

Next, a network management system according to a second example embodiment will be described. A network management apparatus NMS in the present example embodiment monitors quality of a transmission path, and also estimates the quality of the transmission path. Then, the network management apparatus NMS improves a transmission capacity by controlling an interval between adjacent optical signals, based on the quality of the transmission path.

<WDM Signal Light of Second Example Embodiment>

Figure 13:
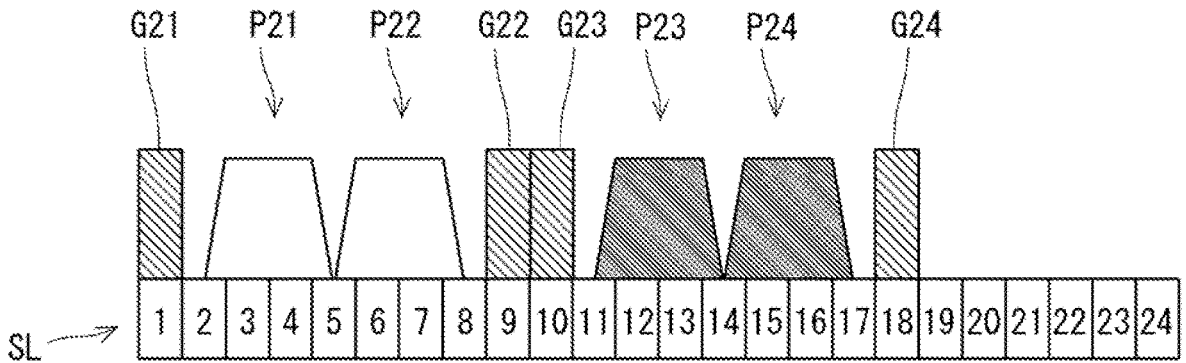
FIG. 13 is a diagram for describing WDM signal light according to a second example embodiment.

FIG. 13 is a diagram for describing WDM signal light according to the second example embodiment. As illustrated in FIG. 13, the WDM signal light includes optical signals P21 to P24.

The optical signal P21 corresponds to a slot SL2 to a slot SL5. The optical signal P22 corresponds to the slot SL5 to a SL8. The optical signal P21 and the optical signal P22 are optical signals to be dropped by the same communication apparatus NE. For example, the optical signal P21 and the optical signal P22 are optical signals to be dropped by a communication apparatus NE4. Guard bands G21 and G22 are provided in slots SL1 and SL9. The optical signal P23 corresponds to a slot SL11 to a slot SL14. The optical signal P24 corresponds to the slot SL14 to a slot SL17. Guard bands G23 and G24 are provided in slots SL10 and SL18. The optical signal P23 and the optical signal P24 are optical signals to be dropped by the same communication apparatus NE. For example, the optical signal P23 and the optical signal P24 are optical signals to be dropped by a communication apparatus NE3. In the second example embodiment, six slots can be reduced as compared with the comparative example.

<Configuration of Network Management Apparatus>

Figure 14:
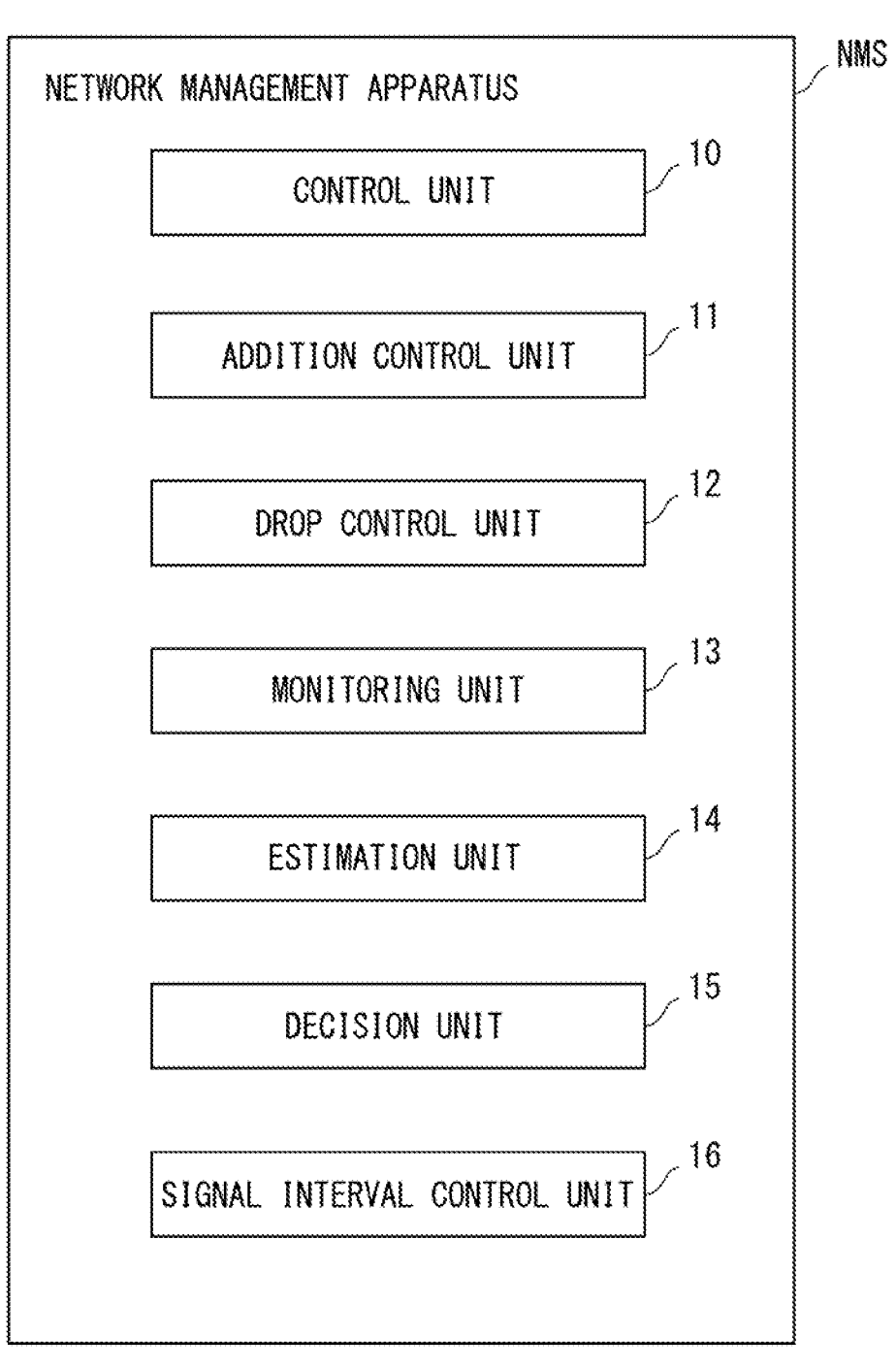
FIG. 14 is a block diagram illustrating a network management apparatus according to the second example embodiment.

FIG. 14 is a block diagram illustrating the network management apparatus NMS according to the second example embodiment. As illustrated in FIG. 14, the network management apparatus NMS further includes a monitoring unit 13, an estimation unit 14, a decision unit 15, and a signal interval control unit 16, in addition to a control unit 10, an addition control unit 11, and a drop control unit 12. The monitoring unit 13, the estimation unit 14, the decision unit 15, and the signal interval control unit 16 each has a function as a monitoring means, an estimation means, a decision means, and a signal interval control means.

The monitoring unit 13 acquires monitor information. Specifically, the monitoring unit 13 monitors at least one piece of monitor information related to quality of a transmission path in at least one of a plurality of communication apparatuses NE. The monitor information is specifically information (monitor parameter) related to a state (quality, and the like) of optical communication, and is, for example, a monitor value acquired by actually measuring an optical signal to noise ratio (OSNR). Note that, the monitoring unit 13 may monitor, as the monitor information in a wavelength cross-connect function units 110 and 120, for example, power and total power of each wavelength band. In addition, the monitoring unit 13 may monitor, as the monitor information in a wavelength multiplexing/demultiplexing function unit 130 and a transponder function unit 140, a quality factor, a spectrum monitor value, a crosstalk (XT) monitor value, a state of polarization (SOP) monitor value, a differential-group-delay (DGD) monitor value, and a wavelength dispersion monitor value.

The estimation unit 14 estimates at least one penalty related to quality of a transmission path. For example, the estimation unit 14 estimates at least one penalty with respect to a receiving side by using the monitored monitor information. Herein, the penalty is a value indicating a degree (deterioration amount) of an element (noise; distortion) that causes deterioration in transmission quality caused by a transmission state of an optical signal. The penalty is, for example, a penalty converted into the OSNR.

<Monitor Value and Penalty>

Figure 15:
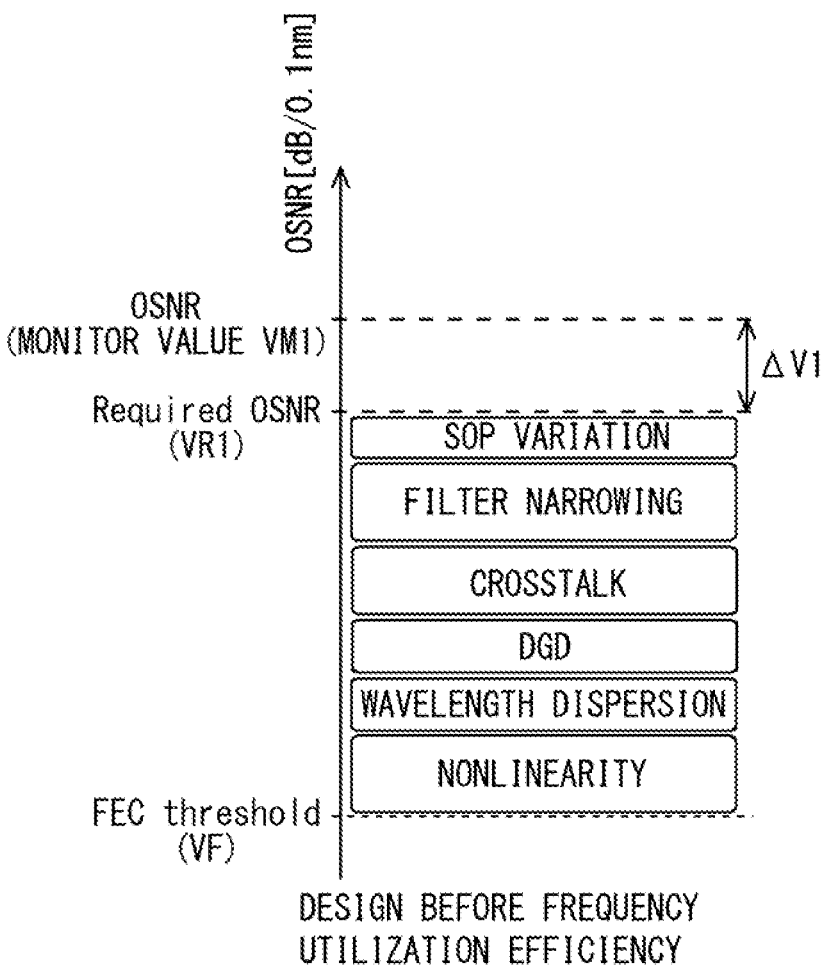
FIG. 15 is a graph illustrating a monitor value of an OSNR monitored by a monitoring unit of the network management apparatus according to the second embodiment, and an OSNR value acquired by converting a penalty estimated by an estimation unit into the OSNR.

FIG. 15 is a graph illustrating a monitor value VM1 of the OSNR being actually measured by the monitoring unit 13 of the network management apparatus NMS according to the second example embodiment, and a value acquired by converting a penalty estimated by the estimation unit 14 into the OSNR. As illustrated in FIG. 15, the monitoring unit 13 monitors the monitor value VM1 acquired by actually measuring the OSNR as the monitor information. The estimation unit 14 estimates, as a penalty, at least one penalty among SOP variation, filter narrowing, crosstalk, a DGD, wavelength dispersion, and nonlinearity. FIG. 15 illustrates each penalty estimated by the estimation unit 14 as a value converted into the OSNR.

The estimation unit 14 estimates a required value VR1, based on each penalty. Specifically, the estimation unit 14 sums a plurality of estimated penalties to a FEC threshold value VF, and thereby calculates the required value VR1. Note that, the FEC threshold value VF is a value acquired by converting a penalty in a transmission path in a load-free state into the OSNR. In addition, the required value VR1 is a value of the OSNR required for the communication apparatus NE on the receiving side not to cause a communication error. When the monitor value VM1 of the OSNR actually measured at the receiving side falls below the required value VR1 for an optical signal transmitted from a transmitting side, a communication error occurs, and therefore the optical signal cannot be transmitted appropriately. In FIG. 15, the actually measured monitor value VM1 has a margin of ΔV1 with respect to the required value VR1.

Figure 16:
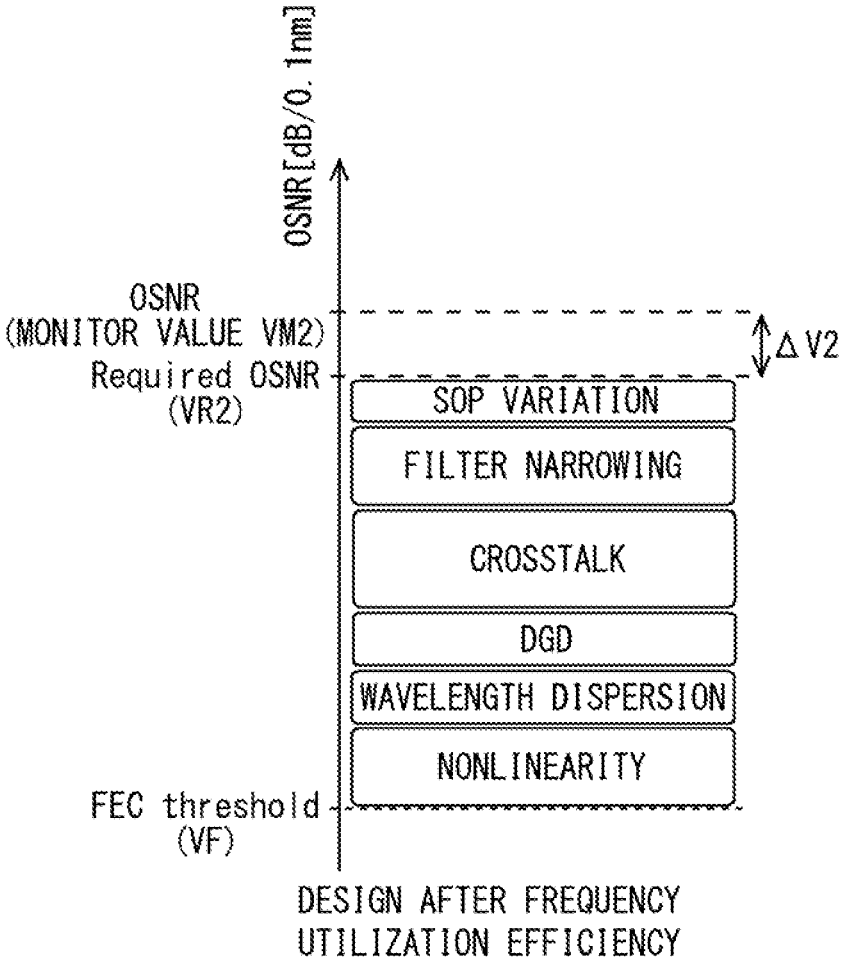
FIG. 16 is a graph illustrating a monitor value of an OSNR monitored by the monitoring unit of the network management apparatus according to the second example embodiment, and an OSNR value acquired by converting a penalty estimated by the estimation unit into the OSNR.

FIG. 16 is a graph illustrating a monitor value VM2 of the OSNR being actually measured by the monitoring unit 13 of the network management apparatus NMS according to the second example embodiment, and a value acquired by converting a penalty estimated by the estimation unit 14 into the OSNR. As illustrated in FIG. 16, the estimation unit 14 may estimate a penalty in a case where an interval between optical signals in a wavelength band is changed. For example, narrowing the interval between optical signals increases the penalty for crosstalk.

Figure 17:
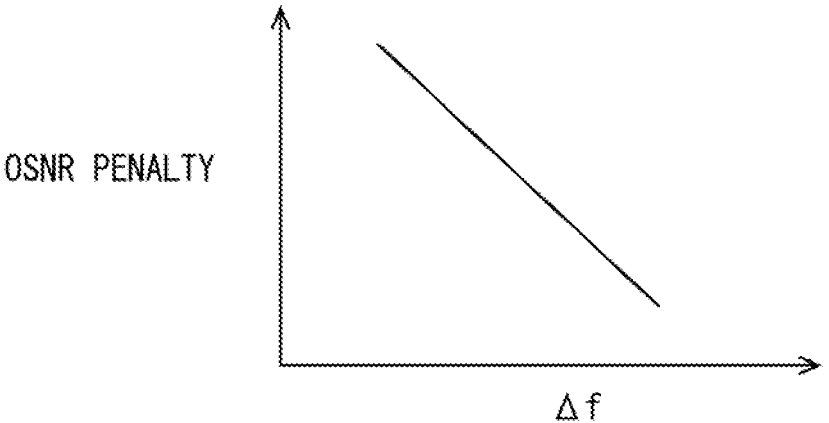
FIG. 17 is a diagram illustrating a method of estimating a penalty by the estimation unit of the network management apparatus according to the second example embodiment.

FIG. 17 is a diagram illustrating a method of estimating a penalty by the estimation unit 14 of the network management apparatus NMS according to the second example embodiment. As illustrated in FIG. 17, the estimation unit 14 may estimate a penalty from a diagram indicating a relationship between an interval (Δf) between optical signals in a wavelength band and a penalty converted into the OSNR. In addition, the estimation unit 14 may estimate a penalty by using a look-up table indicating a correspondence relationship with an interval between optical signals in a wavelength band. The estimation unit 14 calculates a required value VR2 in such a way as to include a penalty for crosstalk estimated when an interval between optical signals is narrowed.

The decision unit 15 decides whether it is possible to reduce an interval between adjacent optical signals in a wavelength band by using monitor information and a penalty. Specifically, the decision unit 15 decides whether a difference ΔV2 acquired by subtracting the required value VR2 of the OSNR from the monitor value VM2 of the OSNR acquired by actually measured as the monitor information exceeds Mr being a predetermined value (margin). As a result, when the difference ΔV2 between the value VM2 of the OSNR actually measured by the monitoring unit 13 and the required value VR2 acquired by summing the penalties is equal to or greater than a predetermined threshold value Mr, the decision unit 15 decides that it is possible to reduce the interval between adjacent optical signals in the wavelength band.

The signal interval control unit 16 controls an interval between adjacent optical signals in a wavelength band. For example, when it is decided that the interval between adjacent optical signals can be reduced, the signal interval control unit 16 controls each communication apparatus NE in such a way as to reduce the interval between the optical signals. Specifically, when the difference ΔV2 acquired by subtracting the required value VR2 of the OSNR from the monitor value VM2 of the OSNR being actually measured is equal to or greater than Mr, the signal interval control unit 16 reduces the interval between the optical signals when the communication apparatus NE adds an optical signal to WDM signal light. At this time, the signal interval control unit 16 may cause a part of the adjacent optical signals to correspond to the same slot SL.

<Method of Deciding Quality of Transmission Path>

Figure 18:
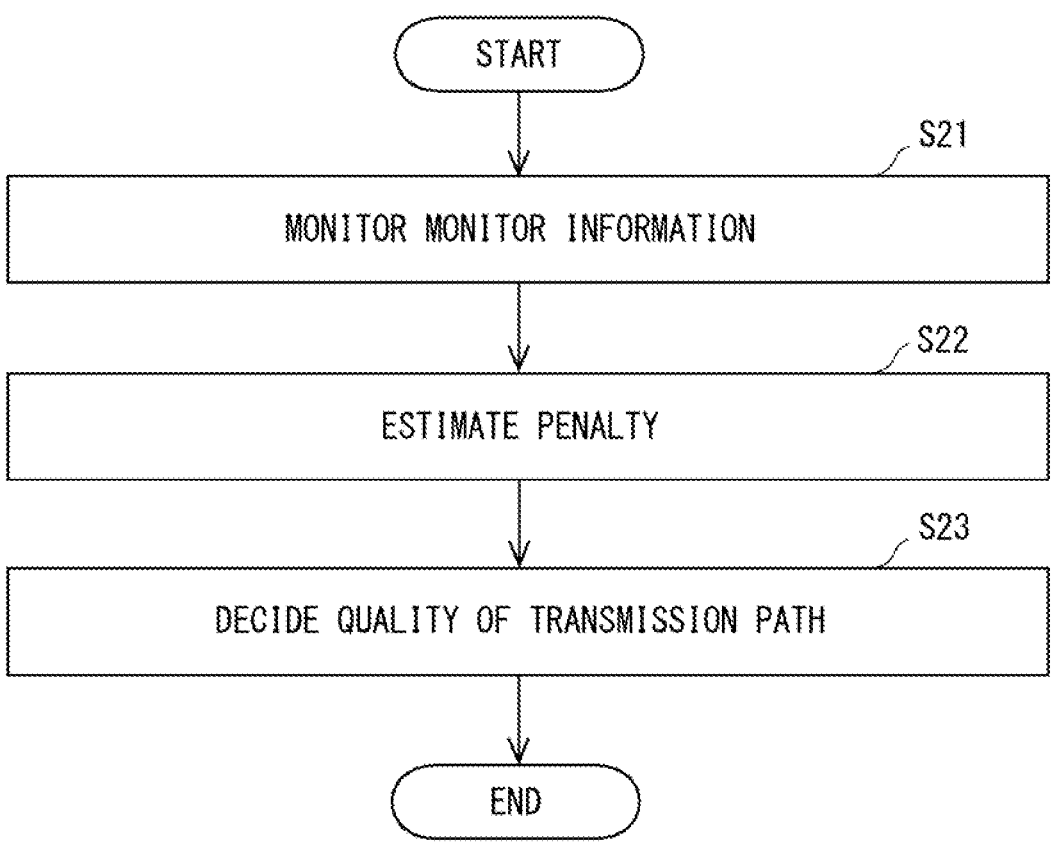
FIG. 18 is a flowchart illustrating a method of deciding quality of a transmission path in a network management method according to the second example embodiment.

Next, a management method according to the second example embodiment will be described. First, a method of deciding quality of a transmission path will be described. FIG. 18 is a flowchart illustrating a method of deciding quality of a transmission path in a network management method according to the second example embodiment.

As illustrated in step S21 in FIG. 18, and FIG. 15, monitor information is monitored. For example, the monitoring unit 13 of the network management apparatus NMS acquires the monitor value VM1 of the OSNR being actually measured, as the monitor information.

Next, as illustrated in step S22, a penalty is estimated. Specifically, the estimation unit 14 of the network management apparatus NMS estimates the penalty, and estimates the required value VR1 converted into the OSNR.

Next, as illustrated in step S23, quality of the transmission path is decided. For example, the decision unit 15 of the network management apparatus NMS decides whether the difference ΔV1 between the monitor value VM1 of the OSNR monitored by the monitoring unit 13 and the required value VR1 of the penalty estimated by the estimation unit 14 is equal to or greater than the Mr. When the difference ΔV1 is equal to or greater than the Mr, the decision unit 15 decides that the quality of the transmission path is good and the interval between adjacent optical signals can be reduced.

<Method of Controlling Interval between Optical Signals>

Figure 19:
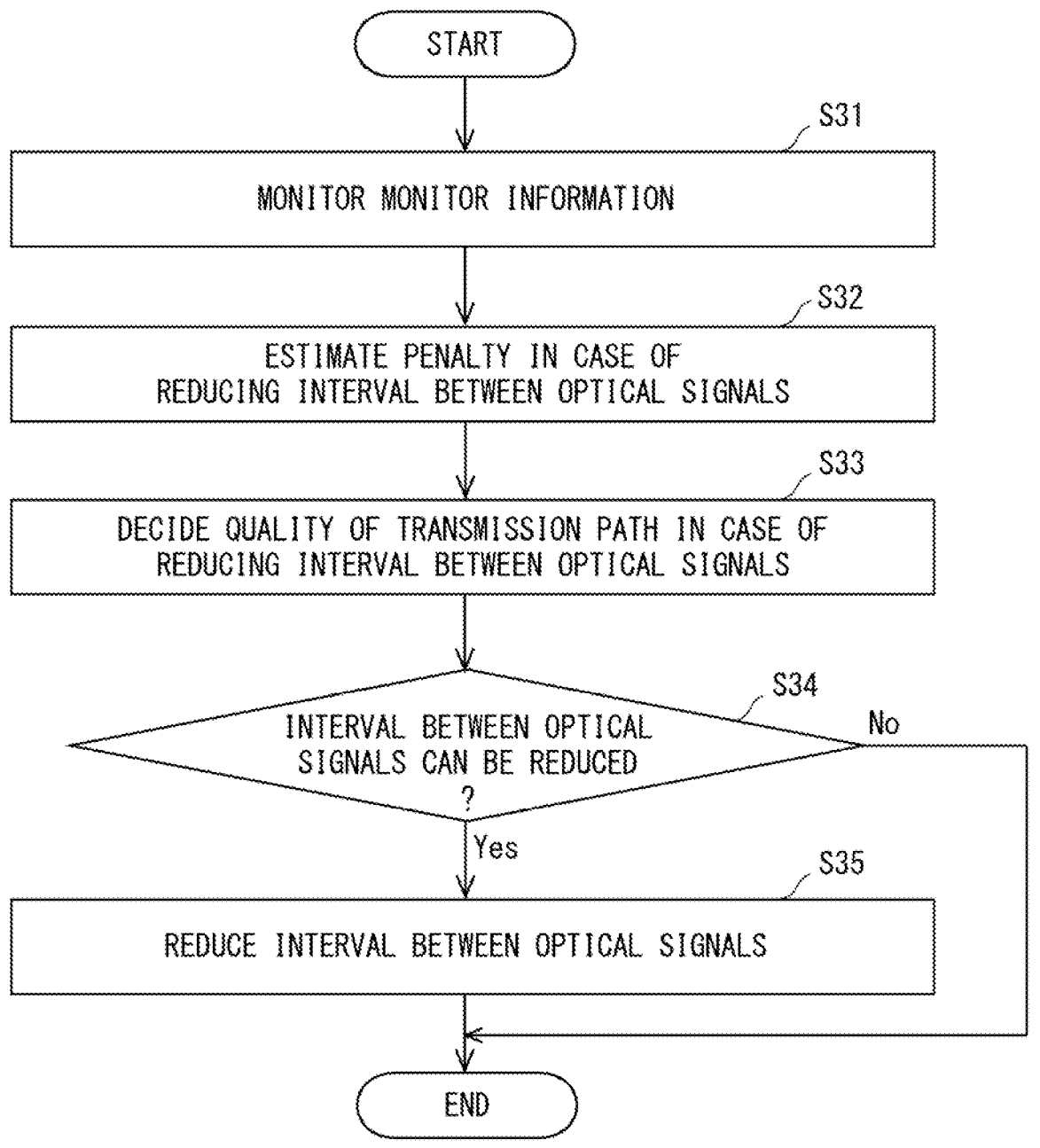
FIG. 19 is a flowchart illustrating a method of controlling an interval between optical signals in the network management method according to the second example embodiment.

Next, a method of controlling an interval between optical signals in a transmission path will be described. FIG. 19 is a flowchart illustrating a method of controlling an interval between optical signals in the network management method according to the second example embodiment.

As illustrated in step S31 in FIG. 19, monitor information is monitored. For example, the monitoring unit 13 of the network management apparatus NMS acquires the monitor value VM2 of the OSNR being actually measured, as the monitor information.

Next, as illustrated in step S32, a penalty in a case where the interval between the optical signals is reduced is estimated. For example, the estimation unit 14 of the network management apparatus NMS estimates the penalty in the case where the interval between adjacent optical signals is reduced, and estimates the required value VR2 converted into the OSNR.

Next, as illustrated in step S33, quality of the transmission path in the case where the interval between the optical signals is reduced is decided. For example, the decision unit 15 of the network management apparatus NMS decides whether the difference ΔV2 between the monitor value VM2 of the OSNR monitored by the monitoring unit 13 and the required value VR2 of the penalty estimated by the estimation unit 14 is equal to or greater than the Mr.

Next, as illustrated in step S34, it is decided whether the interval between the optical signals can be reduced. Specifically, when the difference ΔV2 is smaller than the Mr, the decision unit 15 decides that the interval between the optical signals cannot be reduced. In this case, processing ends.

On the other hand, in step S34, when the difference ΔV2 is equal to or greater than the Mr, it is decided that the interval between the optical signals can be reduced. In this case, as illustrated in step S35, the interval between the optical signals is reduced. Specifically, the signal interval control unit 16 controls each communication apparatus NE in such a way as to reduce the interval between adjacent optical signals. In this way, the interval between the optical signals in the transmission path can be controlled.

Next, an advantageous effect of the present example embodiment will be described. The network management apparatus NMS of the present example embodiment decides whether an interval between adjacent optical signals can be reduced in a wavelength band by using monitor information and a penalty, and controls each communication apparatus NE in such a way as to reduce the interval between adjacent optical signals when it is decided that the interval between optical signals can be reduced. As a result, a transmission capacity can be improved.

In addition, when the difference ΔV2 between the monitor value VM2 of the OSNR actually measured by the monitoring unit 13 and the required value VR2 acquired by converting a penalty into the OSNR is equal to or greater than the predetermined threshold value Mr, it is decided that the interval between the optical signals can be reduced, and thus the transmission capacity can be improved without deteriorating the quality of the transmission path.

Although the invention of the present application has been described above with reference to the outline of the example embodiments, and the first and second example embodiments, the invention of the present application is not limited to the outline of the example embodiments, and the first and second example embodiments described above. Various modifications that can be understood by a person skilled in the art within the scope of the invention of the present application can be made to the configuration and details of the invention of the present application. For example, an example embodiment in which each configurations of the outline of the example embodiments and the first and second example embodiments are combined are also included in the scope of the technical idea.

Some or all of the above-described example embodiments may be described as the following supplementary notes, but are not limited thereto.

(Supplementary Note 1)

A network management method including:

a step of controlling a first communication apparatus, in an optical communication network including a plurality of communication apparatuses being connected by a transmission path transmitting WDM signal light in which a plurality of optical signals are performed wavelength division multiplexing, when the first communication apparatus adds the optical signal to the WDM signal light, in such a way as to add, to be adjacent to each other, a plurality of the optical signals to be dropped by a second communication apparatus to a wavelength band being sandwiched between guard bands; and a step of controlling the second communication apparatus, when the second communication apparatus drops the optical signal from the WDM signal light, in such a way as to drop a plurality of the optical signals being added, to be adjacent to each other, to the wavelength band being sandwiched between the guard bands.

(Supplementary Note 2)

The network management method according to supplementary note 1, wherein the first communication apparatus includes a first cross-connect unit that selects and switches the wavelength band to be added the optical signal, and a transponder unit that transmits the optical signal to be added to the wavelength band, the second communication apparatus includes a second cross-connect unit that selects and switches the wavelength band to be dropped the optical signal, and the transponder unit that receives the dropped optical signal from the wavelength band, the network management method further including:

in the step of controlling the first communication apparatus, controlling the first cross-connect unit and the transponder unit; and, in the step of controlling the second communication apparatus, controlling the second cross-connect unit and the transponder unit.

(Supplementary Note 3)

The network management method according to supplementary note 1 or 2, further including:

a step of monitoring at least one piece of monitor information related to quality of the transmission path in at least one of a plurality of the communication apparatuses;

a step of estimating at least one penalty related to the quality;

a step of deciding whether an interval between the adjacent optical signals in the wavelength band can be reduced by using the monitor information and the penalty; and a step of controlling an interval between the adjacent optical signals in the wavelength band.

(Supplementary Note 4)

The network management method according to supplementary note 3, further including, in the step of estimating, estimating, as the penalty, at least one penalty among SOP variation, filter narrowing, crosstalk, a DGD, wavelength dispersion, and nonlinearity.

(Supplementary Note 5)

The network management method according to supplementary note 3 or 4, further including, in the step of estimating, estimating the penalty by using a look-up table indicating a correspondence relationship with an interval between the optical signals.

(Supplementary Note 6)

The network management method according to any one of supplementary notes 3 to 5, further including, in the step of deciding, when a difference between a monitor value of an OSNR being actually measured and a required value acquired by summing the penalties is equal to or greater than a predetermined threshold value, deciding that an interval between the adjacent optical signals in the wavelength band can be reduced.

(Supplementary Note 7)

The network management method according to any one of supplementary notes 3 to 6, further including, in the step of controlling an interval between the optical signals, reducing an interval between the optical signals when the first communication apparatus adds the optical signal to the WDM signal light.

(Supplementary Note 8)

The network management method according to any one of supplementary notes 3 to 7, wherein the wavelength band includes a plurality of slots, the network management method further including, in the step of controlling an interval between the optical signals, causing a part of the adjacent optical signals to correspond to the same slot.

(Supplementary Note 9)

A network management system including:

an optical communication network configured to include a plurality of communication apparatuses being connected by a transmission path transmitting WDM signal light in which a plurality of optical signals are performed wavelength division multiplexing; and a network management apparatus configured to manage the optical communication network, wherein the network management apparatus includes an addition control unit that control a first communication apparatus, when the first communication apparatus adds the optical signal to the WDM signal light, in such a way as to add, to be adjacent to each other, a plurality of the optical signals to be dropped by a second communication apparatus to a wavelength band being sandwiched between guard bands, and a drop control unit that controls the second communication apparatus, when the second communication apparatus drops the optical signal from the WDM signal light, in such a way as to drop a plurality of the optical signals being added, to be adjacent to each other, to the wavelength band being sandwiched between the guard bands.

(Supplementary Note 10)

The network management system according to supplementary note 9, wherein the first communication apparatus includes a first cross-connect unit that selects and switches the wavelength band to be added the optical signal, and a transponder unit that transmits the optical signal to be added to the wavelength band, the second communication apparatus includes a second cross-connect unit that selects and switches the wavelength band to be dropped the optical signal, and the transponder unit that receives the dropped optical signal from the wavelength band, the addition control unit controls the first cross-connect unit and the transponder unit, and the drop control unit controls the second cross-connect unit and the transponder unit.

(Supplementary Note 11)

The network management system according to supplementary note 9 or 10, wherein the network management apparatus further includes a monitoring unit that monitors at least one piece of monitor information related to quality of the transmission path in at least one of a plurality of the communication apparatuses, an estimation unit that estimates at least one penalty related to the quality, a decision unit that decides whether an interval between the adjacent optical signals in the wavelength band can be reduced by using the monitor information and the penalty, and a signal interval control unit that controls an interval between the adjacent optical signals in the wavelength band.

(Supplementary Note 12)

The network management system according to supplementary note 11, wherein the estimation unit estimates, as the penalty, at least one penalty among SOP variation, filter narrowing, crosstalk, a DGD, wavelength dispersion, and nonlinearity.

(Supplementary Note 13)

The network management system according to supplementary note 11 or 12, wherein the estimation unit estimates the penalty by using a look-up table indicating a correspondence relationship with an interval between the optical signals.

(Supplementary Note 14)

The network management system according to any one of supplementary notes 11 to 13, wherein, when a difference between a monitor value of an OSNR being actually measured by the monitoring unit and a required value acquired by summing the penalties is equal to or greater than a predetermined threshold value, the decision unit decides that an interval between the adjacent optical signals in the wavelength band can be reduced.

(Supplementary Note 15)

The network management system according to any one of supplementary notes 11 to 14, wherein the signal interval control unit reduces an interval between the optical signals when the first communication apparatus adds the optical signal to the WDM signal light.

(Supplementary Note 16)

The network management system according to any one of supplementary notes 11 to 15, wherein the wavelength band includes a plurality of slots, and the signal interval control unit causes a part of the adjacent optical signals to correspond to the same slot.

This application is based upon and claims the benefit of priority from Japanese patent application No. 2021-047961, filed on Mar. 22, 2021, the disclosure of which is incorporated herein in its entirety by reference.

REFERENCE SIGNS LIST

1 NETWORK MANAGEMENT SYSTEM
10 CONTROL UNIT
11 ADDITION CONTROL UNIT
12 DROP CONTROL UNIT
13 MONITORING UNIT
14 ESTIMATION UNIT
15 DECISION UNIT
16 SIGNAL INTERVAL CONTROL UNIT
100 OPTICAL COMMUNICATION NETWORK
110 WAVELENGTH CROSS-CONNECT FUNCTION UNIT
111 WSS CONTROL UNIT
112 WAVELENGTH SELECTIVE SWITCH

120 WAVELENGTH CROSS-CONNECT FUNCTION UNIT
121 WSS CONTROL UNIT
122 WAVELENGTH SELECTIVE SWITCH
130 WAVELENGTH MULTIPLEXING/DEMULTI-PLEXING FUNCTION UNIT
140 TRANSPONDER FUNCTION UNIT
150 NE CONTROL UNIT
NE, NE1, NE2, NE3, NE4 COMMUNICATION APPARATUS
NMS NETWORK MANAGEMENT APPARATUS

What is claimed is:

1. A network manager including a processor and a memory, comprising:

an addition controller configured to control a first communicator communication apparatus, in an optical communication network including a plurality of to add, to be adjacent to each other, a plurality of optical signals to be dropped by a second communicator to a wavelength band being sandwiched between guard bands of a wavelength division multiplexing (WDM) signal light, when the first communicator adds an optical signal in the plurality of optical signals to the WDM signal light, wherein:

the first communicator and the second communicator are among a plurality of communicators included in an optical communication network, and the plurality of communicators are connected by a transmission path transmitting the WDM signal light in which a plurality of optical signals are performed wavelength division multiplexing;

a drop controller configured to control the second communicator, when the second communicator drops the optical signal from the WDM signal light, in such a way as to drop the plurality of optical signals being added, to be adjacent to each other, to the wavelength band being sandwiched between the guard bands;

a monitor configured to monitor at least one piece of monitor information related to quality of the transmission path in at least one of the plurality of communicators;

an estimator configured to estimate at least one penalty related to the quality;

a decision maker configured to decide whether an interval between adjacent optical signals in the wavelength band can be reduced by using the monitor information and the penalty; and a signal interval controller configured to control an interval between the adjacent optical signals in the wavelength band.

2. The network manager according to claim 1, wherein the first communicator includes first cross-connector configured to select and switch the wavelength band to be added the optical signal, and transponder configured to transmit the optical signal to be added to the wavelength band, the second communicator includes second cross-connector configured to select and switch the wavelength band to be dropped the optical signal, and the transponder configured to receive the dropped optical signal from the wavelength band, the addition controller controls the first cross-connector and the transponder, and the drop controller controls the second cross-connector and the transponder.

3. The network manager according to claim 1, wherein the estimator estimates, as the penalty, at least one penalty among SOP variation, filter narrowing, crosstalk, a DGD, wavelength dispersion, and nonlinearity.

4. The network manager according to claim 1, wherein the estimator estimates the penalty by using a look-up table indicating a correspondence relationship with an interval between the optical signals.

5. The network manager according to claim 1, wherein, when a difference between a monitor value of an OSNR being actually measured by the monitor and a required value acquired by summing penalties is equal to or greater than a predetermined threshold value, the decision maker decides that an interval between the adjacent optical signals in the wavelength band can be reduced.

6. The network manager according to claim 1, wherein the signal interval controller reduces an interval between the optical signals when the first communicator adds the optical signal to the WDM signal light.

7. The network manager according to claim 1, wherein
the wavelength band includes a plurality of slots, and
the signal interval controller causes a part of the adjacent optical signals to correspond to a same slot.

8. A communicator including a processor and a memory, comprising:

a transponder configured to transmit a wavelength division multiplexing (WDM) signal light in which optical signals are performed wavelength division multiplexing, wherein the communicator is connected to an optical communication network including a plurality of communicators being connected by a transmission path transmitting the WDM signal light;

a first cross-connector configured to:

select and switch a wavelength band in which an optical signal is to be added, the wavelength band being sandwiched between guard bands of the WDM signal light, and add, to be adjacent to each other, a plurality of optical signals including the optical signal to the wavelength band, wherein the plurality of optical signals is to be dropped by another communicator; and a second cross-connector configured to:

select and switch the wavelength band in which the optical signal is to be dropped, the wavelength band being sandwiched between the guard bands of the WDM signal light, and drop the plurality of optical signals from the WDM signal light, wherein at least one piece of monitor information related to quality of the transmission path in at least one of the plurality of communicators is monitored, at least one penalty related to the quality is estimated, whether an interval between adjacent optical signals in the wavelength band can be reduced by using the monitor information and the penalty is decided, and an interval between the adjacent optical signals in the wavelength band is controlled.

9. A network management system comprising:

an optical communication network including a plurality of communicators being connected by a transmission path transmitting a WDM signal light in which a plurality of optical signals are performed wavelength division multiplexing; and a network manager including a processor and a memory and configured to manage the optical communication network, wherein the network manager includes;

an addition controller configured to control a first communicator, when the first communicator adds an optical signal in the plurality of optical signals to the WDM signal light, in such a way as to add, to be adjacent to each other, the plurality of optical signals to be dropped by a second communicator to a wavelength band being sandwiched between guard bands of the WDM signal light, a drop controller configured to control the second communicator, when the second communicator drops the optical signal from the WDM signal light, in such a way as to drop the plurality of optical signals being added, to be adjacent to each other, to the wavelength band being sandwiched between the guard bands, a monitor configured to monitor at least one piece of monitor information related to quality of the transmission path in at least one of a plurality of the communicators, an estimator configured to estimate at least one penalty related to the quality, a decision maker configured to decide whether an interval between adjacent optical signals in the wavelength band can be reduced by using the monitor information and the penalty, and a signal interval controller configured to control an interval between the adjacent optical signals in the wavelength band.

10. The network management system according to claim 9, wherein the first communicator includes first cross-connector configured to select and switch the wavelength band to be added the optical signal, and transponder configured to transmit the optical signal to be added to the wavelength band, the second communicator includes second cross-connector configured to select and switch the wavelength band to be dropped the optical signal, and the transponder configured to receive the dropped optical signal from the wavelength band, the addition controller controls the first cross-connector and the transponder, and the drop controller controls the second cross-connector and the transponder.

11. The network management system according to claim 9, wherein the estimator estimates, as the penalty, at least one penalty among SOP variation, filter narrowing, crosstalk, a DGD, wavelength dispersion, and nonlinearity.

12. The network management system according to claim 9, wherein the estimator estimates the penalty by using a look-up table indicating a correspondence relationship with an interval between the optical signals.

13. The network management system according to claim 9, wherein, when a difference between a monitor value of an OSNR being actually measured by the monitor and a required value acquired by summing penalties is equal to or greater than a predetermined threshold value, the decision maker decides that an interval between the adjacent optical signals in the wavelength band can be reduced.

14. The network management system according to claim 9, wherein the signal interval controller reduces an interval between the optical signals when the first communicator adds the optical signal to the WDM signal light.

15. The network management system according to claim 9, wherein the wavelength band includes a plurality of slots, and the signal interval controller causes a part of the adjacent optical signals to correspond to a same slot.

* * * * *